United States Patent [19]

Gahler

[11] 4,311,372
[45] Jan. 19, 1982

[54] COMPUTER CONTROLLED ELECTRONIC FLASH

[75] Inventor: Egon Gahler, Hattersheim, Fed. Rep. of Germany

[73] Assignee: Braun AG, Frankfurt am Main, Fed. Rep. of Germany

[21] Appl. No.: 9,697

[22] Filed: Feb. 5, 1979

[30] Foreign Application Priority Data

Feb. 4, 1978 [DE] Fed. Rep. of Germany ....... 2804886

[51] Int. Cl.³ ............................................. G03B 15/05
[52] U.S. Cl. .................................. 354/33; 354/60 F; 315/241 P
[58] Field of Search ................................. 354/31–35, 354/27, 60 F, 145, 141; 315/151, 159, 241 P

[56] References Cited

U.S. PATENT DOCUMENTS 3,846,806 11/1974 Yata et al. ............................. 354/31

FOREIGN PATENT DOCUMENTS 1797078 7/1971 Fed. Rep. of Germany .
1797079 9/1971 Fed. Rep. of Germany .

Primary Examiner—L. T. Hix
Assistant Examiner—W. J. Brady
Attorney, Agent, or Firm—Michael J. Striker

[57] ABSTRACT

An electronic flash unit has a flash tube and a flash circuit which includes an internal light sensor that interrupts the supply of electricity to the flash tube when it senses that the flash light reflected from an object exceeds a predetermined threshold value. The unit also has a connector for connecting it to an external light sensor and an arrangement for disconnecting the internal sensor from the circuit when connection is made to an external sensor, and vice versa. An adapter circuit is connected to the connector and allows the unit to be used with a camera having its own built-in light sensor so that, when the unit is used with such a camera, the camera sensor performs the function otherwise performed by the internal sensor of the unit.

3 Claims, 2 Drawing Figures

COMPUTER CONTROLLED ELECTRONIC FLASH

BACKGROUND OF THE INVENTION

The present invention relates to flash units.

More particularly, the invention relates to a computer-controlled electronic flash unit.

Modern electronic flash units are broadly divided into those having a built-in computer and those which do not have such a computer. In the latter ones the flash intensity is always the same, since during each flash operation the total energy stored in the flash condenser is supplied to the flash tube.

Sometimes, however, it is desired to be able to vary the light intensity of the flash in dependence upon the distance of the object to be photographed, or upon the selected aperture setting. To make this possible computer-controlled electronic flash units have been developed. These have a light-responsive sensor which switches the flash tube off when light reflected from the object reaches a preselected threshold value.

Computer-controlled flash units are either of the series type or the parallel type. Units of the parallel type have a switch which is connected in parallel with the flash tube, whereas in the other type the switch is connected in series with the flash tube. In the parallel type flash units the flash capacitor is fully discharged during each flash operation; in the series type, however, this is not the case since the switch (which closes when the threshold value is reached) blocks further supply of electrical energy to the flash tube. Therefore, the series type units are energy saving since a greater number of flashes can be produced with them per set of batteries (or per charge of the accumulator) than with the parallel type units.

These flash units are self-contained, in that they each have all essential required components. The only external influence, namely the need to connect the units to a camera, has the sole function of supplying the flash unit with a trigger signal while the camera shutter is in open position. Such flash units might therefore be considered as quasi-autonomous units.

There are, however, also computer-controlled electronic flash units which are controlled by a sensor mounted in the camera, rather than in the flash unit itself. For example, German Allowed Application DT-OS No. 1,797,079 discloses a flash unit wherein a photoelectric cell is provided in the unit and another in the camera with which the unit is to be used. Each of these cells can be electrically connected with the flash-duration circuit of the unit to control this circuit and at the same time the respectively other cell will be automatically disconnected from this circuit.

However, it is desirable to be able to use also the conventional, currently marketed computer-controlled electronic flash units with the type of camera having a built-in flash control system. No solution to this problem has heretofore become known.

SUMMARY OF THE INVENTION

Accordingly, it is an object of the invention to provide such a solution.

More especially, it is an object of the invention to provide circuitry which permits optimal cooperation between a conventional computer-controlled electronic flash unit and a camera having built-in flash-control circuitry.

In pursuance of these objects, and of others which will become apparent hereafter, one feature of the invention resides in an electronic flash unit for use with a camera having flash unit connecting terminals and a sensor which senses light entering through a camera lens and which issues a signal to the terminals when the light reaches a threshold value, the flash unit comprising a first section including a flash tube; a second section including circuit means for supplying electrical energy to the flash tube to fire the same, the second section also including an internal light sensor which senses flash light reflected from an object to be photographed, a circuit component operative for terminating the supply of electrical energy to the flash tube when the light sensed by the internal light sensor reaches a threshold value, and means for connecting to the circuit means an external light sensor while simultaneously disconnecting the internal light sensor from the circuit means; and an adapter circuit operative for connecting the second section of the flash unit with the connecting terminals of the camera via the connecting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
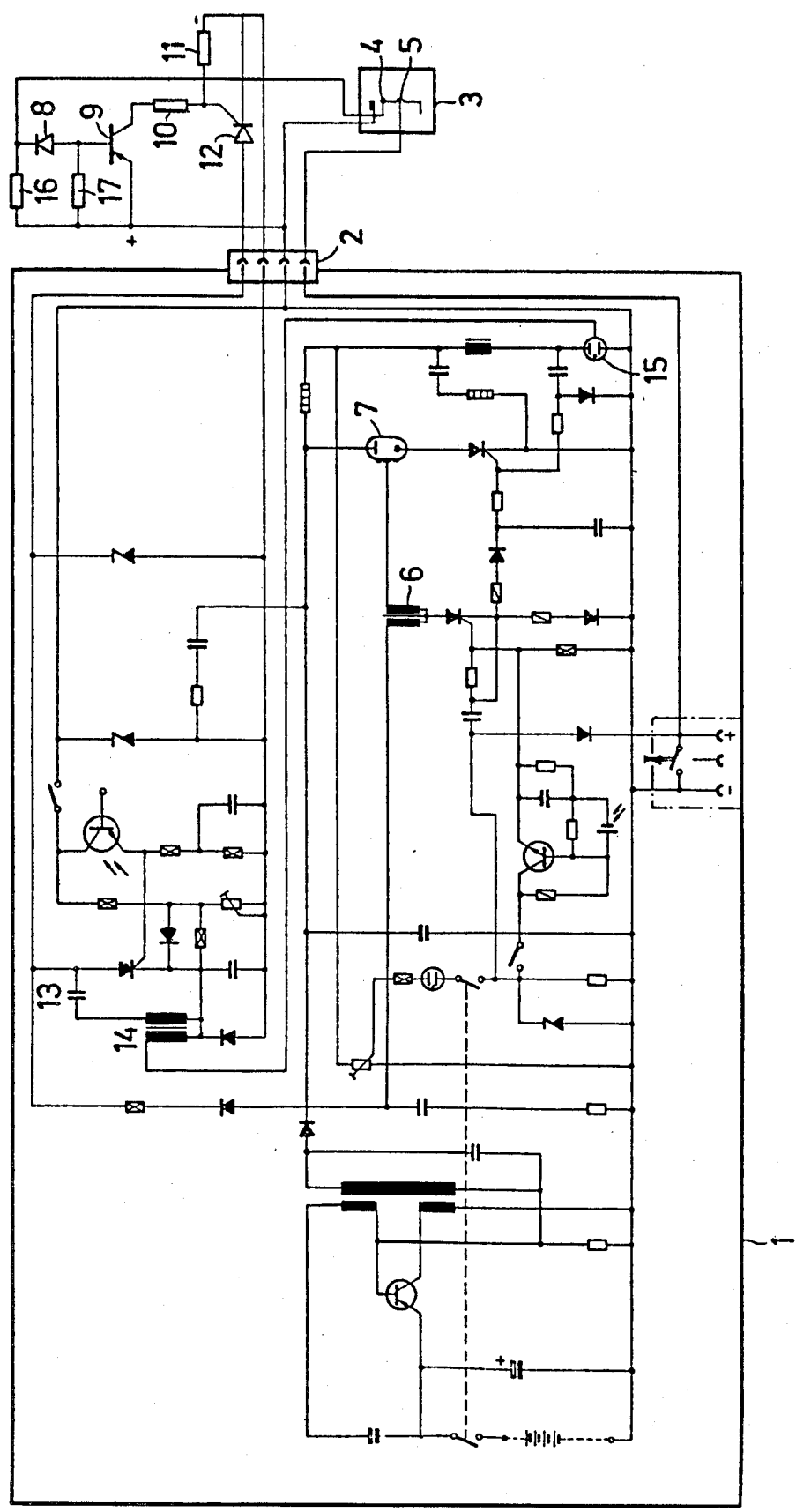
FIG. 1 illustrates a circuit of a computer-controlled flash unit to which an external sensor is connectable.

FIG. 1 shows a circuit diagram 1 of a known-per-se electronic flash unit of the type described in Braun A. G. "Technical Information 380 BVC", Volume 10, 1976. Since the unit is known, only so much will be described of the circuit functions as is essential to an understanding of the invention.

The unit has a connector 2 by means of which it can be electrically coupled with an external sensor. Such sensors are used when it is necessary to measure the reflected flash light at a location which is remote from the unit itself, e.g., at a location which is closer to or farther away from the object being photographed than the unit is. The external sensor—containing a light-sensitive element—is coupled with the connector 2 via a cable so that it can be placed at the desired remote location; it will be this sensor (not shown) which deactivates the flash tube when the sensor determines that the reflected light has reached the given threshold value.

According to the present invention the already existing connector of the known flash unit is used to connect to the flash unit an adapter circuit which permits the unit to be operated in conjunction with a camera having a built-in flash control circuit. In such cameras the flash-unit connection shoe 3 is so constructed as to have one contact 4 for deactivating the flash tube and another contact 5 for triggering the flash tube.

When the flash unit having the circuit of FIG. 1 is mounted on the shoe 3 of such a camera and an exposure is then made with the camera, the contact 5 is energized during the making of the exposure. If the light-sensitive sensor in the camera (not shown) determines that the reflected flash light exceeds a preselected threshold value, the camera produces a negative signal at the contact 4; this signal travels via a diode 8 to the base of transistor 9. This causes the transistor 9 to become conductive and in turn to make the thyristor 12 conductive via the resistors 10, 11, so that the capacitor 13 of the flash unit discharges via the ignition transformer 14. The resulting high-voltage pulse at the secondary winding of transformer 14 switches off the flash tube 7 via a tube 15 and other circuit elements in a manner known per se (described in the aforementioned publication).

The resistor 16 shown in FIG. 1 adapts the flash unit for cooperation with the camera, and the resistor 17 is the working resistor for transistor 9.

Figure 2:
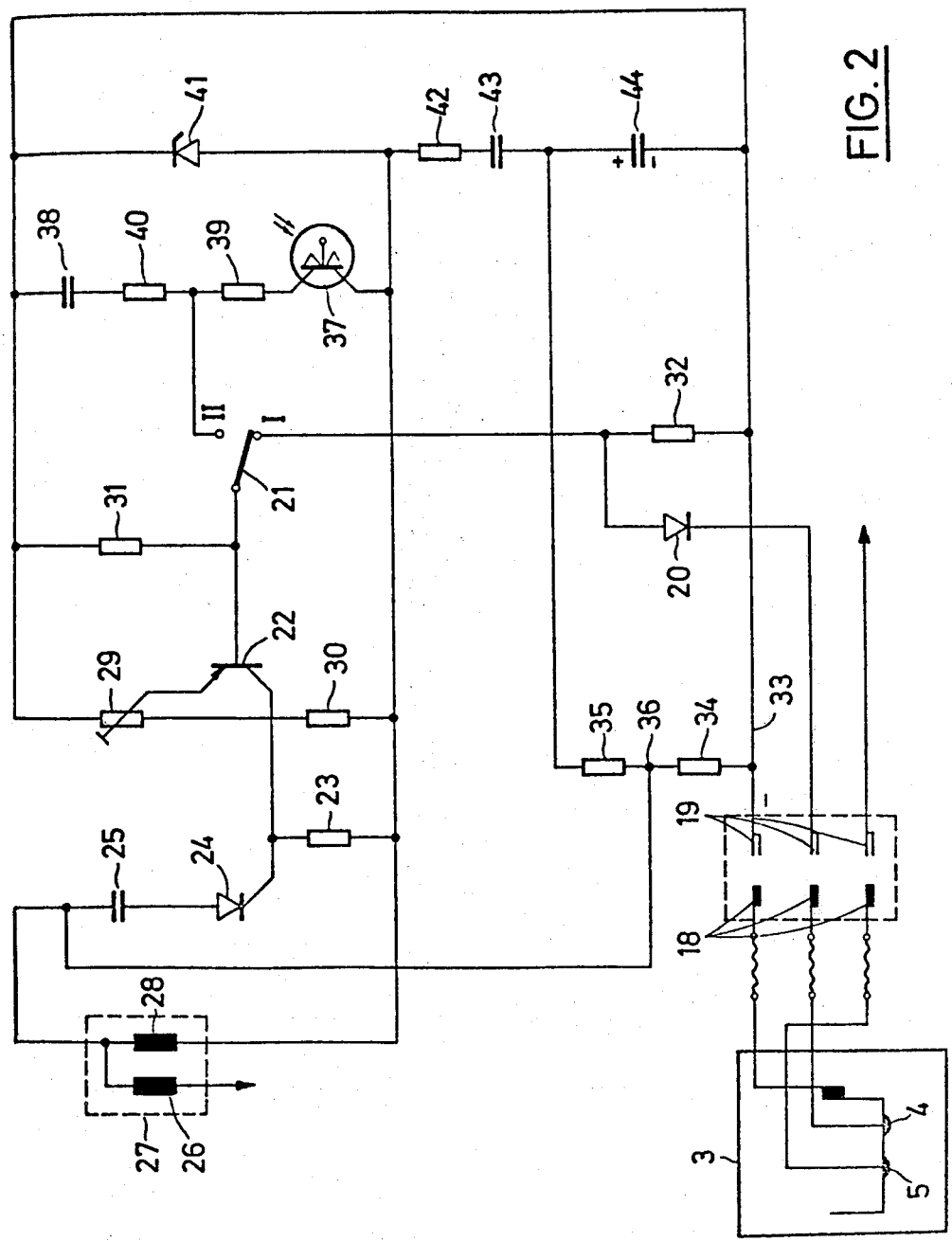
FIG. 2 illustrates a circuit for a computer-controlled flash unit without external sensor.

Another embodiment of the invention is shown in FIG. 2. It is suitable for a flash unit which is (or is to be) directly coupled with a camera having a flash control circuit. Here, the mounting shoe 3 of the camera is coupled with a synchronizing plug which can be inserted into corresponding sockets 19 of the flash unit. It will be understood that this flash unit can also be used with cameras which do not have a flash control unit, if an appropriate switching arrangement (not part of the invention) is provided.

In this embodiment, also, initiation of flash operation takes place via the conduit 5 of shoe 3, as well as via one pole of the plug 18 and one of the sockets 19.

The circuit elements following the sockets 19 are not illustrated, because they are known per se and do not form a part of the invention.

As in the preceding embodiment, the signal for terminating the flash (i.e., by deactivating the flash tube) originates at contact 4 of shoe 3 and is supplied via diode 20 to switch 21. If the switch 21 is in the position shown in FIG. 2, the signal is transmitted to the base of a transistor 22. This causes the transistor 22 to go conductive, producing a potential drop at the resistor 23. Because of this potential drop the thyristor 24 fires and discharges the capacitor via the primary winding 26 of an ignition transformer. This causes a signal to appear at the secondary winding 28 of the transformer 27, which signal is supplied to the switching tube. Since the circuit elements connected to the secondary winding 28 of transformer are known per se, they have not been illustrated in FIG. 2.

The voltage divider composed of the resistors 29, 30 enables the potential to be set at the transistor 22. This potential can be changed with the aid of the (variable) resistor 29. The working resistor 31 of transistor 22 is connected between one terminal of resistor 29 and the base of transistor 22.

A resistor 32, serving to adapt the flash unit for use with the respective camera, has one terminal which is connected to the anode of diode 20, and another terminal which is connected to mass at 33. A voltage divider composed of two resistors 34, 35 is also connected to mass; its center 36 is connected to the conductor connecting the capacitor 25 with the secondary winding 28 of the transformer 27. This voltage divider is used to produce a relatively low potential for capacitor 25. Switch 21 has two operating positions I and II. When it is in position I, the flash unit is set to cooperate with a camera having an internal flash control circuit. On the other hand, setting of switch 21 to its position II changes the flash unit to autonomous operation, i.e., it now operates independently of any control by the camera except for the flash-triggering signal.

Such autonomous operation is known per se, as mentioned before, and a brief description will therefore suffice.

When impinged by light, the sensor 37 in the flash unit charges a capacitor 38 via two resistors 39, 40, the latter of which serves to accommodate the unit to operations under conditions when the unit is located close to the objective to be photographed. The computer is composed of elements 37, 39, 40, 38 (it is known per se and requires no detailed description) and is supplied with electrical energy from a Zener diode 41 which is connected with the electrolytic flash capacitor 44 via a resistor 42 and a capacitor 43. When a flash is produced, the capacitor 44 discharges across the (not illustrated) flash tube. When the potential at capacitor 38 reaches a predetermined threshold value, due to the charging by the light-sensitive element 37, then the transistor 22 becomes conductive and fires the thyristor 24. Thereafter, the flash tube is deactivated in the manner described with reference to the preceding embodiment.

It will be understood that additional circuit elements are present between the capacitor 44 and the not-illustrated flash tube. However, as these are known per se and are not necessary to an understanding of the invention, they have not been shown.

While the invention has been illustrated and described as embodied in a flash unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electronic flash unit for use with a camera having flash unit connecting terminals and a sensor which senses light entering through a camera lens and which issues a signal to said terminals when the light reaches a threshold value, said flash unit comprising a first section including a flash tube; a second section including an internal light sensor which senses flash light reflected from an object to be photographed and circuit means for supplying the electrical energy to the flash tube to fire the same including a firing transformer for said flash tube, and an electronic switch having a control electrode and being connected in series with said flash tube for terminating the supply of electrical energy thereto when the light sensed by one of said sensors reaches a threshold value, the connecting terminals of the camera including a first terminal which is operative for triggering a flash and at least indirectly connectable with said firing transformer, and a second terminal which is operative for terminating the flash and at least indirectly connectable with said control electrode; and an adapter circuit operative for connecting said second section of said flash unit with the connecting terminals of the camera, including a diode and a transistor having a base connected to said diode and a collector connected with said control electrode, said circuit means including a primary winding of said transformer and a capacitor connected to discharge across said primary winding, and a secondary winding of said transformer and a further electronic switch in circuit with said secondary winding and the first-mentioned electronic switch, the second terminal of the camera producing said signal in form of a negative potential which is supplied via said diode to said base of said transistor so that the transistor forwards a signal to said further electronic switch which causes said capacitor to discharge across said primary winding with resultant generation of a current pulse in said secondary winding, which current pulse effects operation of the first-mentioned electronic switch to deactivate the flash tube.

2. An electronic flash unit for use with a camera having flash unit connecting terminals and a sensor which senses light entering through a camera lens and which issues a signal to said terminals when the light reaches a threshold value, said flash unit comprising a first section including a flash tube; a second section having circuit means for supplying electrical energy to said flash tube to fire the same, including a firing transformer for said flash tube, said second section also including an internal light sensor which senses flash light reflected from an object to be photographed, and an electronic switch having a control electrode and being connected in series with said flash tube for terminating the supply of electrical energy to said flash tube when the light sensed by said internal light sensor reaches a threshold value; an adapter circuit operative for connecting said second section of said flash unit with the connecting terminals of the camera, the connecting terminals of the camera including a first terminal which is operative for triggering a flash and at least indirectly connectable via said adapter circuit with said firing transformer, and a second terminal which is operative for terminating the flash and at least indirectly connectable with said control electrode via said adapter circuit; and means for connecting to said circuit means an external light sensor while simultaneously disconnecting said internal light sensor from said circuit means, including a transfer switch, said circuit means further including a transistor having a base connected with said transfer switch and a collector, a thyristor having a control electrode connected to said collector, a transformer having a primary winding and capacitor connected with said thyristor and with said transformer so that said capacitor is discharged across said primary winding when said thyristor is rendered conductive in response to operation of said connecting means.

3. An electronic flash unit as defined in claim 2, said transfer switch having one position in which it is connected with said first terminal, and another position in which it is in circuit with a conductor of said circuit means which connects a light sensor with another capacitor.

* * * * *